(12) United States Patent
Anderson et al.

(10) Patent No.: US 10,170,959 B2
(45) Date of Patent: Jan. 1, 2019

(54) ELECTRICAL MACHINES AND METHODS OF ASSEMBLING THE SAME

(71) Applicants:Hub City, Inc., Aberdeen, SD (US); Regal Beloit America, Inc., Beloit, WI (US); REGAL BELOIT AUSTRALIA PTY LTD, Rowville, VIC (AU)

(72) Inventors: Larry Gene Anderson, Aberdeen, SD (US); Wesley Kenneth Anderson, Cedarburg, WI (US); Charles Richard Langford, Grays Point (AU)

(73) Assignee: Regal Beloit America, Inc., Beloit, WI (US)

( * ) Notice: Subject to any disclaimer, the term of this patent is extended or adjusted under 35 U.S.C. 154(b) by 782 days.

(21) Appl. No.: 13/799,697

(22) Filed: Mar. 13, 2013

(65) Prior Publication Data

US 2014/0265738 A1    Sep. 18, 2014

(51) Int. Cl.
| | | |
|---|---|---|
| *H02K 7/116* | (2006.01) | |
| *H02K 7/08* | (2006.01) | |
| *H02K 21/24* | (2006.01) | |
| *H02K 7/00* | (2006.01) | |
| *H02K 5/173* | (2006.01) | |
| *H02K 9/14* | (2006.01) | |

(52) U.S. Cl.
CPC ........... *H02K 7/116* (2013.01); *H02K 5/1735* (2013.01); *H02K 7/003* (2013.01); *H02K 7/085* (2013.01); *H02K 21/24* (2013.01); *H02K 9/14* (2013.01); *H02K 2213/03* (2013.01); *Y10T 29/49012* (2015.01)

(58) Field of Classification Search
CPC ...... H02K 7/10–7/1085; H02K 1/2793; H02K 21/026; H02K 9/22; H02K 1/182; H02K 21/24; H02K 37/08; H02K 37/125
USPC .............................................. 310/64, 156.32
See application file for complete search history.

(56) References Cited

U.S. PATENT DOCUMENTS

| | | | |
|---|---|---|---|
| 3,974,408 A | | 8/1976 | Fehr et al. |
| 3,999,092 A | * | 12/1976 | Whiteley ............... H02K 21/24 |
| | | | 310/114 |
| 4,763,031 A | | 8/1988 | Wang |
| 5,254,895 A | * | 10/1993 | Koizumi ................ G11B 19/20 |
| | | | 310/156.06 |
| 5,392,737 A | | 2/1995 | Newman et al. |
| 5,631,511 A | | 5/1997 | Schulmann et al. |

(Continued)

OTHER PUBLICATIONS

An International Search Report and Written Opinion, dated Jul. 8, 2014, for co-pending International Application No. PCT/US14/22708 (12 pgs).

(Continued)

*Primary Examiner* — Thomas Truong
(74) *Attorney, Agent, or Firm* — Armstrong Teasdale LLP

(57) ABSTRACT

A motor having an axis of rotation is provided. The motor includes a housing, a first shaft coupled to the housing and a second shaft coupled to the first shaft. The motor further includes a stator coupled to the housing and comprising an outer circumferential surface and an inner circumferential surface, wherein the inner circumferential surface defines a stator bore around the axis of rotation. A gearbox is coupled to the first shaft and to the second shaft and positioned within the stator bore. The motor includes a rotor coupled to the first shaft and adjacent the stator.

10 Claims, 10 Drawing Sheets

(56) References Cited

U.S. PATENT DOCUMENTS

| | | | |
|---|---|---|---|
| 5,804,935 A * | 9/1998 | Radev | B60K 17/356 |
| | | | 180/65.7 |
| 6,255,751 B1 * | 7/2001 | Hoffmann | H02K 7/083 |
| | | | 310/40 MM |
| 6,282,895 B1 | 9/2001 | Johansson et al. | |
| 6,768,237 B1 | 7/2004 | Schroedl | |
| 7,067,950 B2 | 6/2006 | Hirzel et al. | |
| 7,263,983 B2 | 9/2007 | Maeda | |
| 2003/0189388 A1 * | 10/2003 | Hashimoto | H02K 7/116 |
| | | | 310/268 |
| 2004/0145246 A1 | 7/2004 | Nakano et al. | |
| 2006/0001269 A1 | 1/2006 | Jansen et al. | |
| 2006/0019786 A1 * | 1/2006 | Asa | F01C 17/02 |
| | | | 475/5 |
| 2006/0138878 A1 | 6/2006 | Hoffman et al. | |
| 2008/0236318 A1 * | 10/2008 | Ai | F16H 1/28 |
| | | | 74/421 A |
| 2008/0236908 A1 | 10/2008 | Cooper et al. | |
| 2009/0224625 A1 * | 9/2009 | Hino | H02K 21/028 |
| | | | 310/209 |
| 2010/0187954 A1 * | 7/2010 | Kendall | B60K 7/0007 |
| | | | 310/67 R |
| 2011/0133592 A1 | 6/2011 | Hino et al. | |
| 2012/0104902 A1 | 5/2012 | Fukui et al. | |
| 2012/0313465 A1 | 12/2012 | Prix | |

OTHER PUBLICATIONS

Australian Patent Examination Report No. 1, dated Sep. 4, 2014, for co-pending Australian patent application No. 2013204050 (5 pgs.).

* cited by examiner

ELECTRICAL MACHINES AND METHODS OF ASSEMBLING THE SAME

BACKGROUND OF THE INVENTION

The embodiments described herein relate generally to electrical machines, and more particularly, to methods and systems for coupling a motor and a gearbox together within a housing of the electrical machines.

Certain electrical machines are sometimes referred to as brushless motors. Brushless motors include both brushless AC motors and brushless DC motors and are used in a wide variety of systems operating in a wide variety of industries. Motors commonly include a stator and a rotor with each having a plurality of stacked laminations and a central bore for receiving a rotating shaft. A housing encloses the motor and the electronics that control the motor. The housing includes a pair of end frames or end caps which are coupled to opposite ends of the stator to facilitate supporting the rotor. Proper radial and axial alignment among the motor components is desired to facilitate providing free rotation of the shaft for a variety of speeds and torques.

To provide speed and torque for a given application, some electrical machines may couple the motor to a gearbox which includes the necessary gear ratio to deliver the required speed and torque from an input shaft to an output shaft. This application, however, may require numerous sizes of motors and numerous sizes of gearboxes to cover a variety of speed and torque ranges. Multiple gearbox assemblies may lead to increased inventory costs, operating costs, maintenance costs and/or replacement costs. In some electrical machines, coupling the gearbox to the input shaft and to the output shaft may increase the size and axial length of the electrical machine. Increasing the size, however, could result in space constraint issues and in increased manufacturing costs, operating costs, maintenance costs and/or replacement costs.

Moreover, if not properly dissipated, heat generated by electronics and/or other components during operation of the electrical machine can shorten the life span of various electronics and/or motor components and/or generally result in poor performance of the electrical machine. Some electrical machines couple a cooling fan to the input shaft for heat dissipation. The fan, however, in combination with conventional gearboxes may also increase the size of the electrical machine.

BRIEF DESCRIPTION OF THE INVENTION

In one aspect, a motor having an axis of rotation is provided. The motor includes a housing, a first shaft coupled to the housing and a second shaft coupled to the first shaft. The motor further includes a stator coupled to the housing, wherein the stator includes an outer circumferential surface and an inner circumferential surface. The inner circumferential surface defines a stator bore around the axis of rotation. A gearbox is coupled to the first shaft and to the second shaft and positioned within the stator bore. The motor includes a rotor coupled to the first shaft and adjacent the stator.

In another aspect, a motor having an axis of rotation is provided. The motor includes a housing, a first shaft coupled to the housing and a second shaft coupled to the first shaft. The motor further includes a stator coupled to the housing, wherein the stator includes an outer circumferential surface and an inner circumferential surface. The inner circumferential surface defines a stator bore around axis of rotation. A rotor is coupled to the first shaft and includes a first arm and a second arm. The first arm is configured to extend axially along the axis of rotation and within the stator bore and the second arm is configured to extend radially from the axis of rotation. A gearbox is coupled to the first shaft and the second shaft.

In yet another aspect, a method of assembling an electrical machine is provided. The electrical machine includes a housing and an axis of rotation. The method includes coupling a first shaft to a second shaft and coupling a stator to the housing, wherein the stator defines a stator bore that extends around the axis of rotation. The method includes coupling a gearbox to the first shaft and to the second shaft. The gearbox is positioned within the stator bore. A rotor is coupled to the first shaft and adjacent to the stator.

In another aspect, a method of assembling an electrical machine is provided. The method includes coupling a first shaft to a second shaft and coupling a stator to the housing, wherein the stator defines a stator bore that extends around the axis of rotation. A gearbox is coupled to the first shaft and to the second shaft and adjacent the stator bore. The method includes coupling a first arm of a rotor to the first shaft. The first arm is positioned within the stator bore. The method includes coupling a second arm of the rotor to the stator.

DETAILED DESCRIPTION OF THE INVENTION

The embodiments described herein relate to electrical machines and methods of assembling the electrical machines. More particularly, the embodiments relate to a motor and a gearbox fully integrated within a motor housing for each electrical machine to maximize space usage within the housing. It should be understood that the embodiments described herein for electrical machines are not limited to motors, and further understood that the descriptions and figures that utilize a motor, a housing and gearbox fins are exemplary only. Moreover, while the embodiments illustrate an axial permanent magnet motor, the embodiments described herein may be included within motors having any number of configurations and/or phases.

Figure 1:
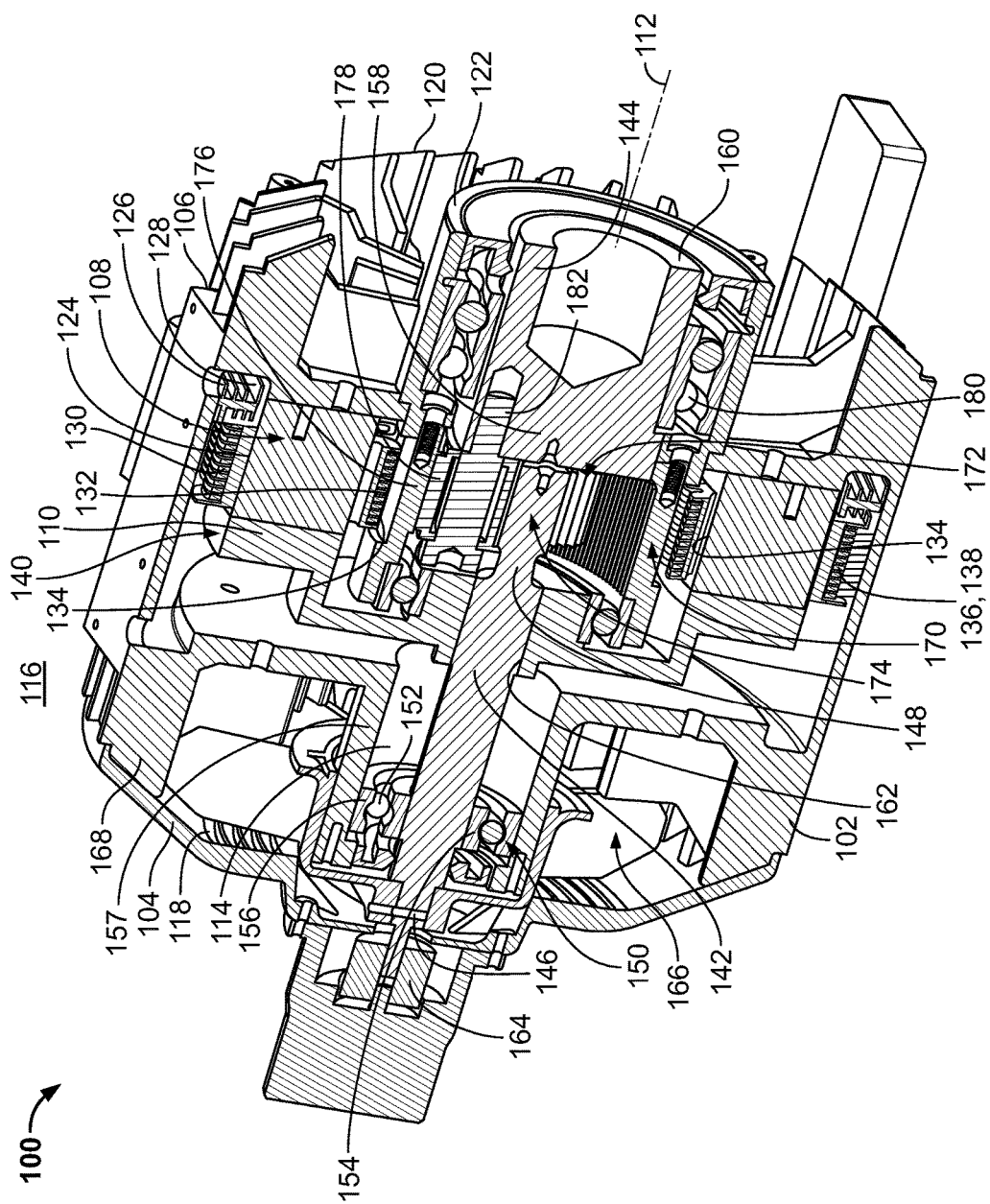
FIG. 1 is perspective cut-away view of an exemplary electrical machine having an electric motor and a gearbox coupled to the motor.
Figure 2:
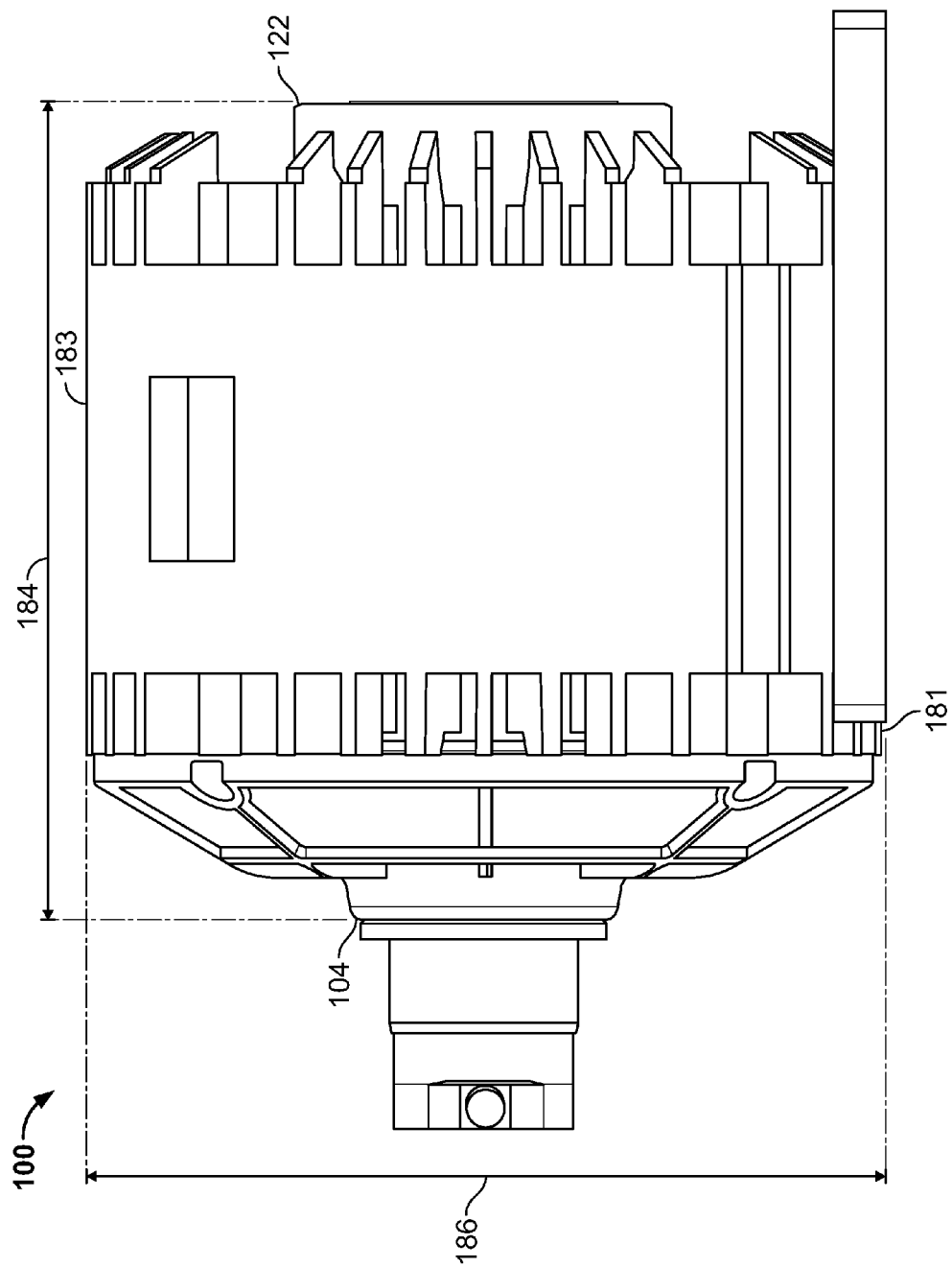
FIG. 2 is side elevational view of the electrical machine shown in FIG. 1.

FIG. 1 is a perspective cut-away view of an exemplary electrical machine 100 that can be operated as either a generator or a motor. FIG. 2 is side elevational view of machine 100. Electric motor 100 includes a housing 102 having a first end cap 104 and a second end cap 106. Electric motor 100 further includes a stationary assembly 108 and a rotatable assembly 110 configured about an axis of rotation 112. Motor housing 102 defines an interior 114 and an exterior 116 of motor 100 and is configured to at least partially enclose and protect stationary assembly 108 and rotatable assembly 110. First end cap 104 includes vents 118 disposed therethrough to facilitate directing ambient air into interior 114. Second end cap 106 includes heat fins 120 which are configured to transfer heat from interior 114 to exterior 116. Moreover, second end cap 106 includes a shaft extension 122 that extends axially along axis of rotation 112. Stationary assembly 108 includes a stator core, which includes a plurality of stator teeth 126 and a plurality of winding stages 128 wound around stator teeth 126 and adapted to be electronically energized to generate an electromagnetic field. In the exemplary embodiment, a variable frequency drive (not shown) provides a signal, for example, a pulse width modulated (PWM) signal, to electric motor 100.

In an exemplary embodiment, stationary assembly 108 is a three phase concentrated wound stator assembly and stator 124 is formed from a stack of laminations (not shown) made of a magnetically permeable material. While stationary assembly 108 is illustrated for purposes of disclosure, it is contemplated that other stationary assemblies of various other constructions having different shapes, configurations, phases and different numbers of teeth may be utilized. Stator 124 includes an outer circumferential surface 130 and an inner circumferential surface 132, wherein inner circumferential surface 132 defines a stator bore 134. In the exemplary embodiment, stator bore 134 is positioned around axis of rotation 112.

Stationary assembly 108 further includes a heat transfer member 136 coupled to outer circumferential surface 130. Alternatively, heat transfer member 136 may be coupled to inner circumferential surface 132. In the exemplary embodiment, heat transfer member 136 includes a potted material 138. Heat transfer member 136 is configured to transfer heat from stator 124 to exterior 116. Heat transfer member 136 can include any configuration and/or composition to transfer heat from interior 114 to exterior 116. Alternatively, heat transfer member 136 is optional.

Rotatable assembly 110 includes a rotor 140 such as, for example, a permanent magnet rotor core or an induction rotor. Rotatable assembly 110 may also be referred to as an interior permanent magnet rotor. While rotatable assembly 110 is illustrated for purposes of disclosure, it is contemplated that other rotatable assemblies of various other constructions having different shapes, configurations, phases and different numbers of teeth may be utilized. Rotatable assembly 110 further includes a first shaft 142 and a second shaft 144. First shaft 142 includes a first end 146 and a second end 148, and is supported by a bearing assembly 150 such as a roller bearing 152 supported by an inner race 154 that is coupled to first end 146 and an outer race 156 coupled to a housing support 157. Second shaft 144 includes a first end 158 and a second end 160, wherein second end 160 of second shaft 144 includes a keyless, hollow bore. Alternatively, second end 160 may include a solid shaft extension. Second end 160 may include any configuration to enable work output for motor 100.

In the exemplary embodiment, rotor 140 is formed from a stack of laminations (not shown) made of a magnetically permeable material that is coupled to first shaft 142 and between first end cap 104 and stationary assembly 108. Rotor 140 includes a shaft opening 162 having a diameter corresponding to a diameter of first shaft 142. Rotor 140 and first shaft 142 are concentric and configured to rotate about axis of rotation 112. Rotor 140 and stator 124 are illustrated as being solid in FIG. 1 for simplicity, their construction being well known to those of ordinary skill in the art. For example, stator 124 and rotor 140 may be formed using a sintering process from a soft magnetic composite (SMC) material, a soft magnetic alloy (SMA) material, and/or a powdered ferrite material.

Winding stages 128 are commutated without brushes by sensing the rotational position of rotatable assembly 110 as it rotates within housing 102 and utilizing electrical signals generated as a function of the rotational position of rotatable assembly 110 sequentially to apply a voltage to each of winding stages 128 in different preselected orders or sequences that determine the direction of the rotation of rotatable assembly 110. Position sensing may be accomplished by an encoder 164 and a position-detecting circuit (not shown) responsive to the back electromotive force (EMF) to provide a simulated signal indicative of the rotational position of rotatable assembly 110 to control the timed sequential application of voltage to winding stages 128 of stationary assembly 108. Other means of position sensing may also be used. Motor 100 includes a voltage rating which is determined by the motor manufacturer and which is stored in a control system (not shown). Motor 100 further includes a pre-determined operating threshold, which is also stored in the control system, for efficient operation of motor 100.

Motor 100 includes a fan 166 coupled to first end 146 of first shaft 142. Fan 166 draws ambient air from exterior 116, through vents 118 and into interior 114 to facilitate cooling motor 100. In the exemplary embodiment, an accessory (not shown) such as a brake is coupled to first shaft 142. Moreover, in the exemplary embodiment, a heat fin 168 is coupled to housing support 157 and is positioned adjacent fan 166. Heat fin 168 is positioned at least partially within interior 114 and is configured to transfer heat from interior 114, to housing 102 and out into exterior 116.

Motor 100 includes a gearbox 170 coupled to first shaft 142 and to second shaft 144. In the exemplary embodiment, gearbox 170 is positioned within stator bore 134 of stationary assembly 108. More particularly, gearbox 170 is positioned within inner circumferential surface 132 and around axis of rotation 112. Gearbox 170 includes a planetary gear assembly 172 having a sun gear 174, a ring gear 176 and a plurality of planet gears 178 coupled to sun gear 174 and ring gear 176. Sun gear 174 is coupled to second end 148 of first shaft 142, while ring gear 176 is coupled to housing 102 and within inner circumferential surface 132. Planet gears 178 are coupled to second shaft 144 which is supported by a bearing assembly 180. In the exemplary embodiment, a pin 182 couples planet gears 178 to second shaft 144. Alternatively, a bolt can couple planet gears 178 to second shaft 144. Any type of fastener can be used to couple planet gears 178 to second shaft 144. A lubrication assembly (not shown) is coupled to gearbox 170 and is configured to discharge lubricant to at least one of first shaft 142, second shaft 144 and planetary gear assembly 172. A seal (not shown) isolates lubrication from stator 124 and rotor 140.

In the exemplary embodiment, ring gear 176 is positioned within stator bore 134 wherein planet gears 178 and sun gear 174 are positioned internal to ring gear 176. Since planetary gear assembly 172 is positioned within stator bore 134, gearbox 170 is sized, shaped and located within housing 102 to reduce the size of motor 100. More particularly, the space within stator bore 134 is efficiently utilized by positioning gearbox 170 within stator bore 134.

Due to gearbox positioning within stator bore 134, motor 100 includes a first length 184, as measured from first end cap 104 to shaft extension 122, having a range from about 5 inches to about 15 inches. In the exemplary embodiment, first length 184 is about 10.4 inches. A second length 186, as measured from a housing base 181 to a housing top 183 includes a range from about 5 inches to about 15 inches. In the exemplary embodiment, second length 186 is about 10.5 inches. Alternatively, first length 184 and second length 186 can include any dimension to enable motor 100 to function.

Figure 3:
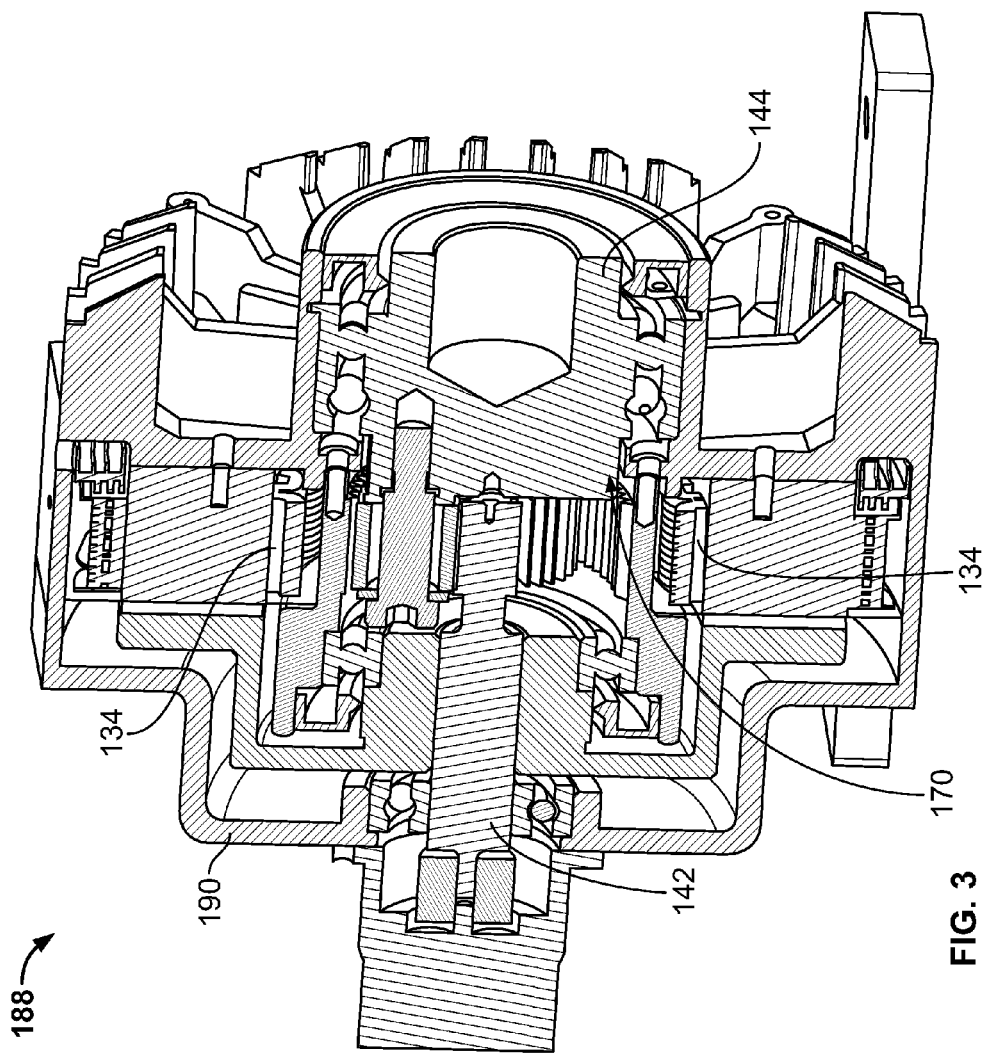
FIG. 3 is perspective cut-away view of another exemplary electrical machine having an electric motor and a gearbox coupled to the motor.
Figure 4:
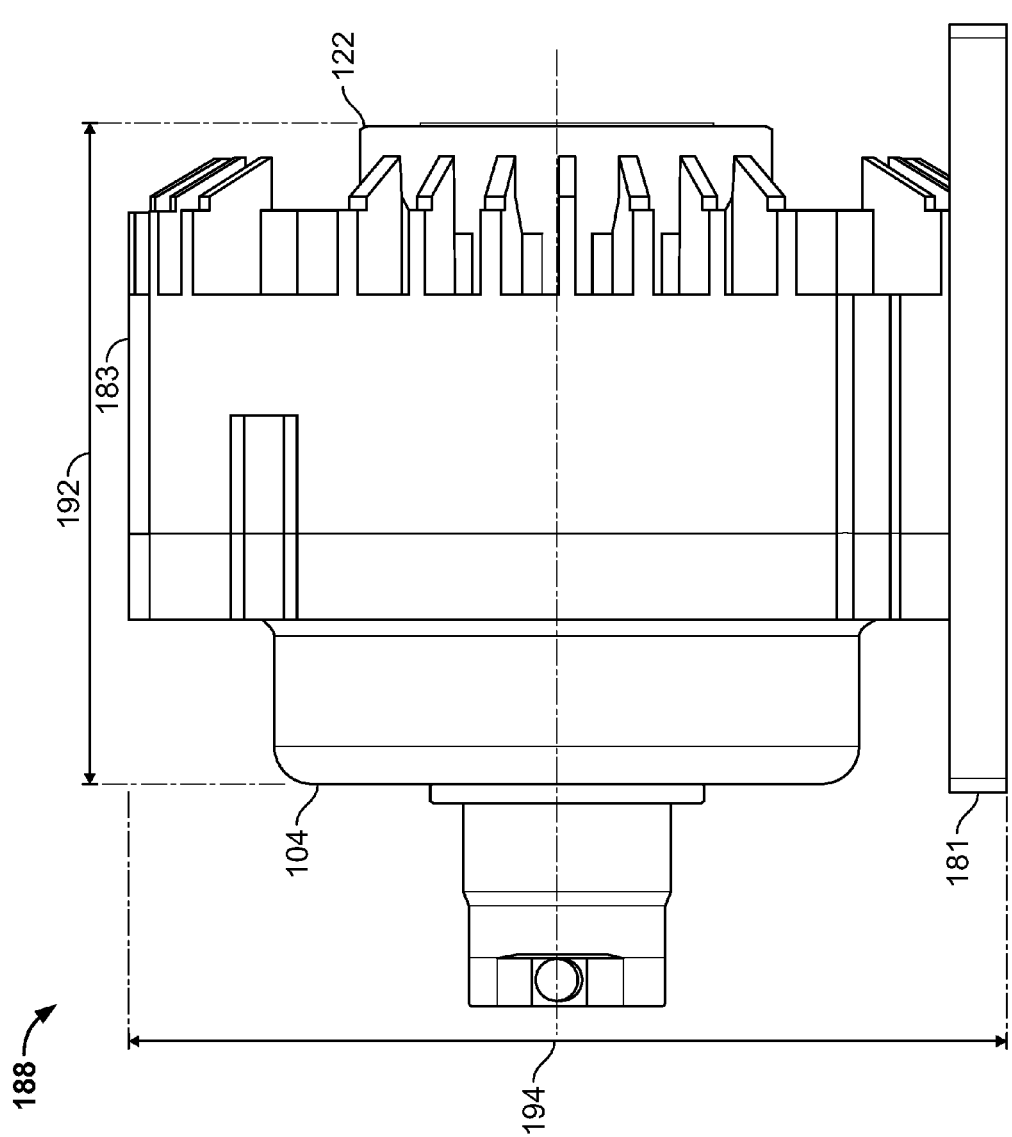
FIG. 4 is side elevational view of the electrical machine shown in FIG. 3.

FIG. 3 is a cross sectional view of another motor 188. FIG. 4 is a side elevational view of motor 188 shown in FIG. 3. In FIGS. 3 and 4, the same or similar components of FIGS. 1 and 2 are noted with the same reference numerals as noted in FIGS. 1 and 2. In the exemplary embodiment, motor 188 includes a non-vented configuration 190. More particularly, motor 188 does not include a fan and vents. Gearbox 170 is coupled to first shaft 142 and to second shaft 144 and is positioned within stator bore 134. Gearbox 170 is sized, shaped and located to reduce the size of motor 100. More particularly, the space within stator bore 134 is efficiently utilized by positioning gearbox 170 within stator bore 134.

Moreover, due to gearbox positioning within stator bore 134, motor 188 includes a first length 192, as measured from first end cap 104 to shaft extension 122. First length 192 includes a range from about 5 inches to about 15 inches. In the exemplary embodiment, first length 192 is about 7.8 inches. A second length 194, as measured from housing base 181 to housing top 183 includes a range from about 5 inches to about 15 inches. In the exemplary embodiment, second length 194 is about 10.4 inches. Alternatively, first length 192 and second length 194 can include any dimension to enable motor 188 to function.

Figure 5:
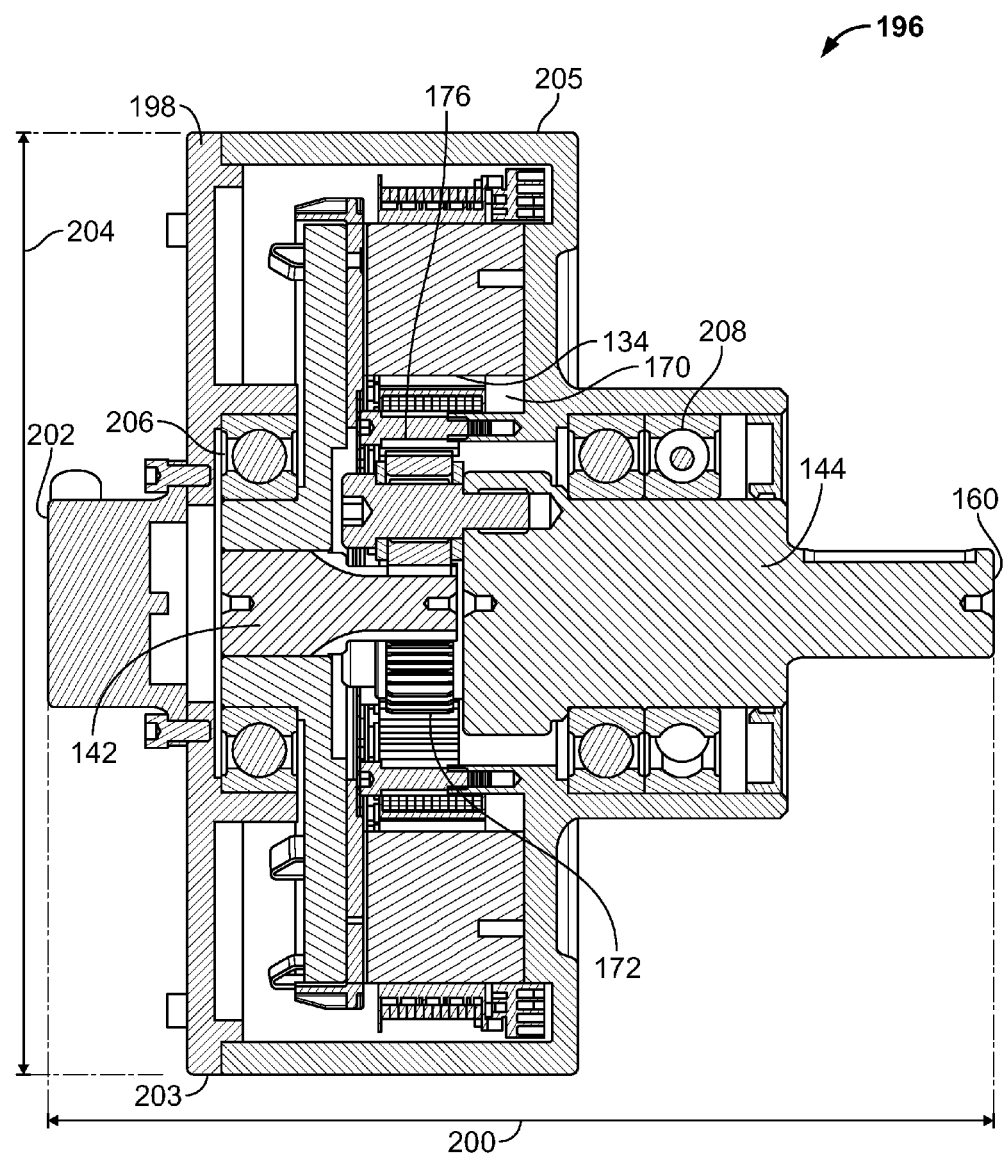
FIG. 5 is side cross sectional view of another exemplary electrical machine having an electric motor and a gearbox coupled to the motor.

FIG. 5 is a cross sectional view of another exemplary motor 196. In FIG. 5, the same or similar components of FIGS. 1 and 2 are noted with the same reference numerals as noted in FIGS. 1 and 2. In the exemplary embodiment, motor 196 includes a non-vented configuration 198. Gearbox 170 is coupled to first shaft 142 and second shaft 144 and positioned within stator bore 134. Gearbox 170 is sized, shaped and located to reduce the size of motor 196. More particularly, the space within stator bore 134 is efficiently utilized by positioning gearbox 170 within stator bore 134. In the exemplary embodiment, planet gear assembly 172 includes a 6:1 ratio and ring gear 176 includes about a six inch diameter. Moreover, a bearing assembly 206 supports first shaft 142 and bearing assembly 208 supports second shaft 144.

Motor 196 includes a first length 200 as measured from an encoder housing 202 to second end 160 of second shaft 144. First length 200 includes a range from about 5 inches to about 15 inches. In the exemplary embodiment, first length 200 is about 10.75 inches. A second length 204, as measured from a housing bottom 203 to a housing top 205 includes a range from about 5 inches to about 15 inches. In the exemplary embodiment, second length 204 is about 10.75 inches. Alternatively, first length 200 and second length 204 can include any dimension that enables motor 196 to function.

Figure 6:
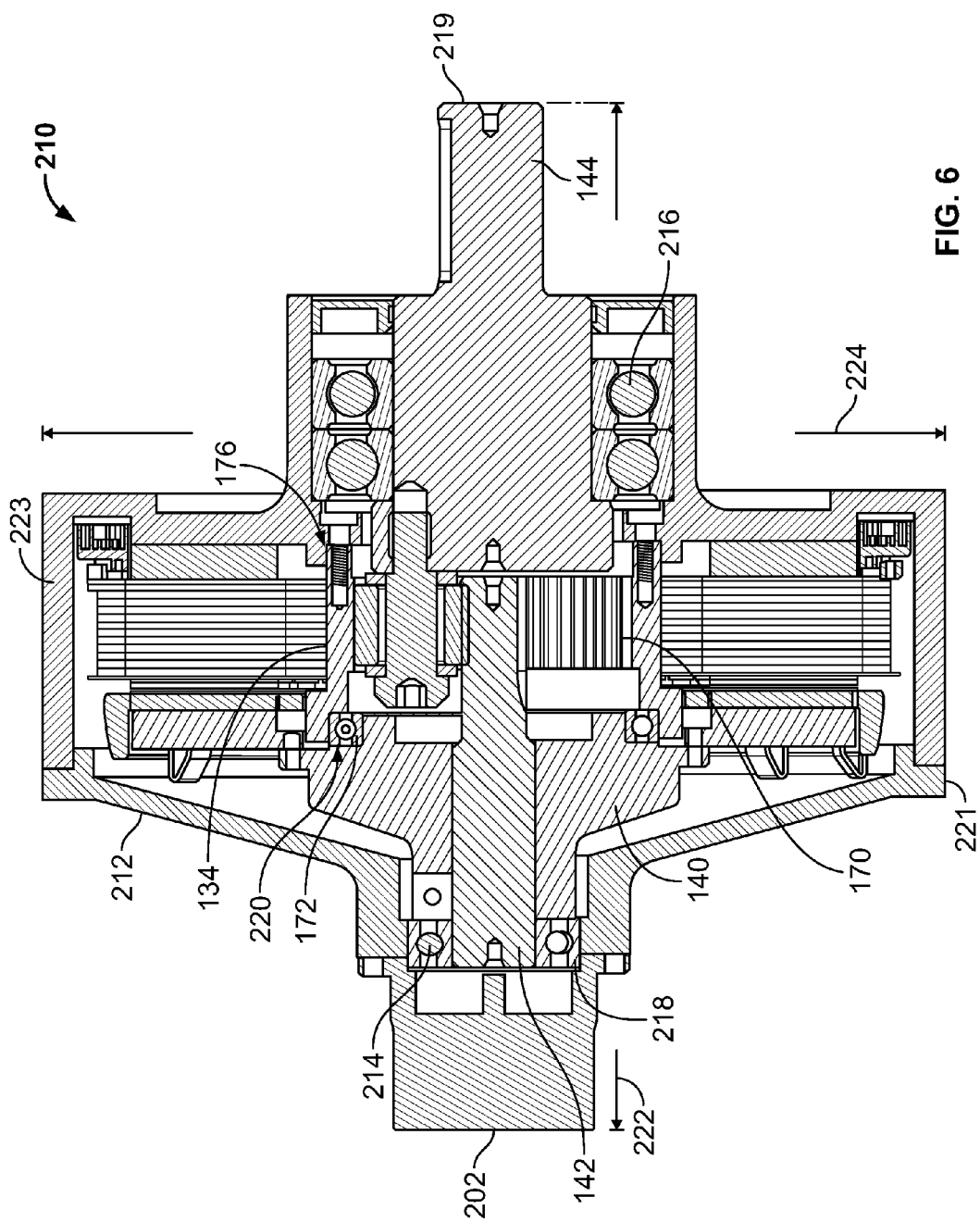
FIG. 6 is side cross sectional view of another exemplary electrical machine having an electric motor and a gearbox coupled to the motor.

FIG. 6 is a cross sectional view of another motor 210. In FIG. 6, the same or similar components of FIGS. 1 and 2 are noted with the same reference numerals as noted in FIGS. 1 and 2. In the exemplary embodiment, motor 210 includes a non-vented configuration 212. Gearbox 170 is coupled to first shaft 142 and second shaft 144 and positioned within stator bore 134. Gearbox 170 is sized, shaped and located to reduce the size of motor 210. Gearbox 170 may include any diametral pitch gearing, diameter size and/or gear size to enable gearbox 170 to function as described herein. More particularly, the space within stator bore 134 is efficiently utilized by positioning gearbox 170 within stator bore 134. Bearing assembly 214 supports first shaft 142 and bearing assembly 216 supports second shaft 144. A fastener 218, such as a spring washer, couples bearing assembly 214 to housing 102. Moreover, a bearing assembly 220 is coupled to rotor 140 and to ring gear 176 to support ring gear 176. In the exemplary embodiment, bearing assembly 220 includes a ball bearing press fit to a rotor hub and slip fit into ring gear 176.

Second shaft 144 includes a solid shaft extension 219. Alternatively, second shaft 144 may include a keyless, hollow end. Due to gearbox positioning within stator bore 134, motor 210 includes a first length 222 as measured from encoder housing 202 to extension 219. First length 222 includes a range from about 5 inches to about 15 inches. In the exemplary embodiment, first length 222 is about 10.25 inches. A second length 224, as measured from a housing bottom 221 to a housing top 223 includes a range from about 5 inches to about 15 inches. In the exemplary embodiment, second length 224 is about 10.75 inches. Alternatively, first length 222 and second length 224 can include any dimension to enable motor 210 to function.

Figure 7:
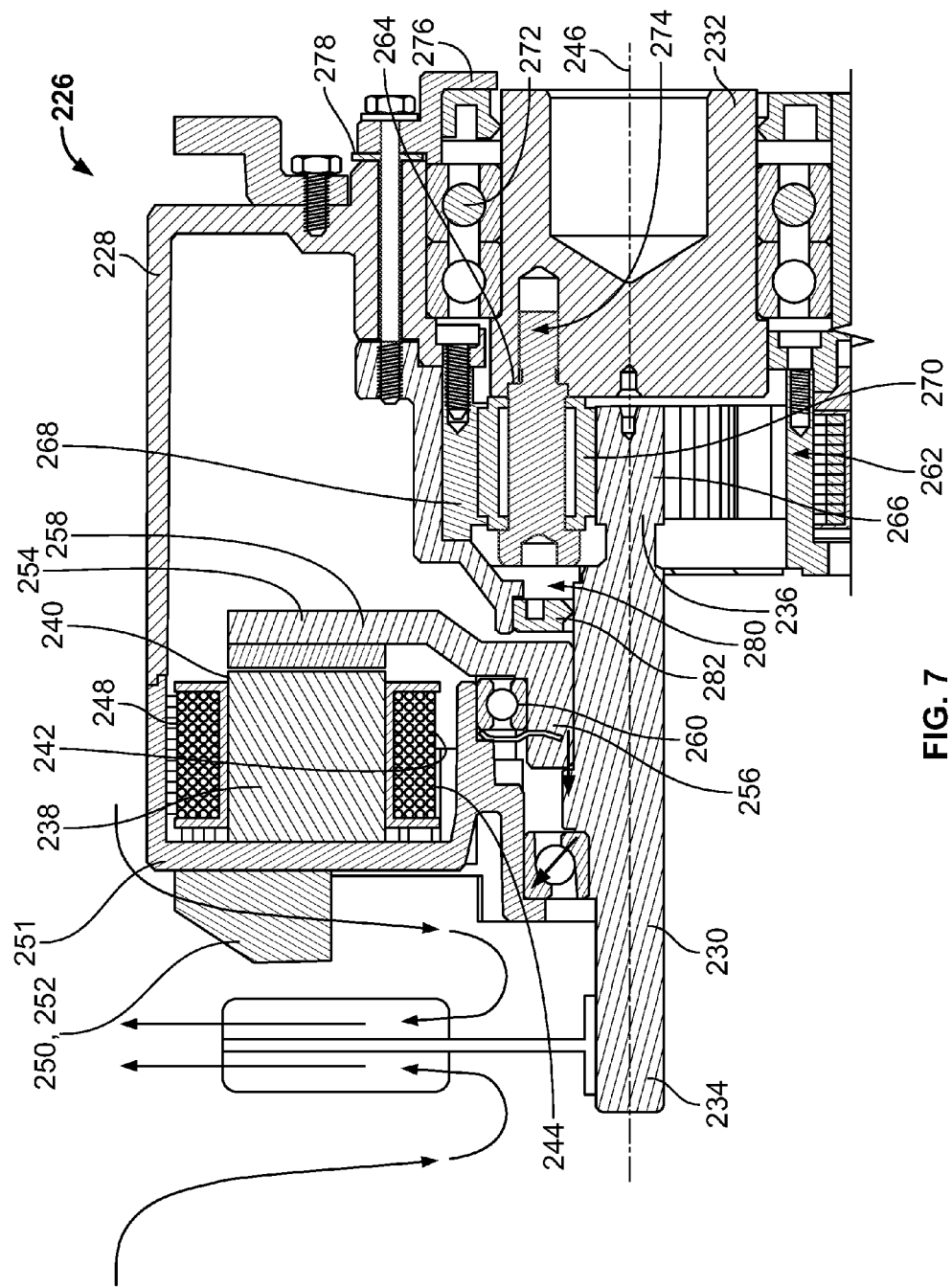
FIG. 7 is side cross sectional view of another exemplary electrical machine having an electric motor and a gearbox coupled to the motor.

FIG. 7 is a side cross sectional view of another exemplary motor 226. Motor 226 includes a housing 228, a first shaft 230 and a second shaft 232 coupled to first shaft 230. First shaft 230 includes a first end 234 and a second end 236. A stator 238 is coupled to housing 228 and includes an outer circumferential surface 240 and an inner circumferential surface 242, wherein inner circumferential surface 242 defines a stator bore 244 around an axis of rotation 246. A first heat transfer member 248 is coupled to outer circumferential surface 240 to transfer heat from stator 238 and into housing 228. In the exemplary embodiment, first heat transfer member 248 includes a potted material. Alternatively, first heat transfer member 248 can include any configuration and/or material composition to enable heat transfer out of stator. Still further, heat transfer member 248 can be optional. A second heat transfer member 250 is coupled to a housing support 251 and adjacent stator 238. In the exemplary embodiment, second heat transfer member 250 includes a heat fin 252 at least partially positioned within interior 253. Heat fin 252 is configured to transfer heat from stator 238 and into housing 228. Heat fin 252 can include any configuration and/or material composition to enable heat transfer out of stator 238.

Motor 226 includes a rotor 254 coupled to first shaft 230. In the exemplary embodiment, rotor 254 includes a first arm 256 coupled to first shaft 230. More particularly, first arm 256 is positioned within stator bore 244, wherein first arm 256 extends axially along, and parallel to, axis of rotation 246. Rotor 254 further includes a second arm 258 coupled to first arm 256 and extending radially from axis of rotation 246. In the exemplary embodiment, second arm 258 is electro-magnetically coupled to stator 238. A bearing assembly 260 is positioned within stator bore 244 and couples to support 251 and to first arm 256. Bearing assembly 260 supports rotor 254 during rotation. Moreover, bearing assembly 260 supports first shaft 230 during rotation. Stator 238 and rotor 254 are sized, shaped and located to reduce the size of motor 226. More particularly, the space within stator bore 244 is efficiently utilized by positioning first arm 256 and bearing 260 within stator bore 244.

A gearbox 262 is coupled to first shaft 230 and to second shaft 232. In the exemplary embodiment, gearbox 262 is positioned between rotor 254 and an end cap 276 wherein end cap 276 is coupled to housing support 228. Gearbox 262 includes a planetary gear assembly 264 having a sun gear 266, a ring gear 268 and a plurality of planet gears 270 coupled to sun gear 266 and ring gear 268. Sun gear 266 is coupled to second end 236 of first shaft 230 and ring gear 268 is coupled to housing 228. Planet gears 270 are coupled to second shaft 232 which is supported by a bearing assembly 272. In the exemplary embodiment, a pin 274 couples planet gears 270 to second shaft 232. Alternatively, a fastener such as a bolt can couple planet gears 270 to second shaft 232. Any type of fastener can be used to couple planet gears 270 to second shaft 232.

In the exemplary embodiment, planetary gear assembly 264 may include any pitch rating, gear size, diameter size and/or diametral gearing to enable gearbox 262 to function as described herein. In the exemplary embodiment, gearbox 262 is pre-assembled for efficient and convenient installation within housing 228. More particularly, gearbox 262 is coupled to second shaft 232 and to end cap 276. A gasket 278 seals the interface between end cap 276 and housing 228. Since gearbox 262 couples to end cap 276, gearbox 262 is positioned within housing 228 as are stator 238 and rotor 254. This positioning reduces the size of motor 226. Moreover, since end cap 276 removably couples to housing 228, interchangeability of gearbox 262 is enhanced to facilitate replacing gearbox 262. Interchangeability of gearbox 262 increases the availability of different output speeds and/or torques while reducing maintenance and/or replacement costs.

A lubrication assembly 280 is coupled to gearbox 262 and is configured to discharge lubricant (not shown) to at least one of first shaft 230 and second shaft 232. Lubrication assembly 280 is positioned away from stator 238 and rotor 254, wherein a seal 282 isolates lubrication assembly 280 from stator 238 and rotor 254.

Figure 8:
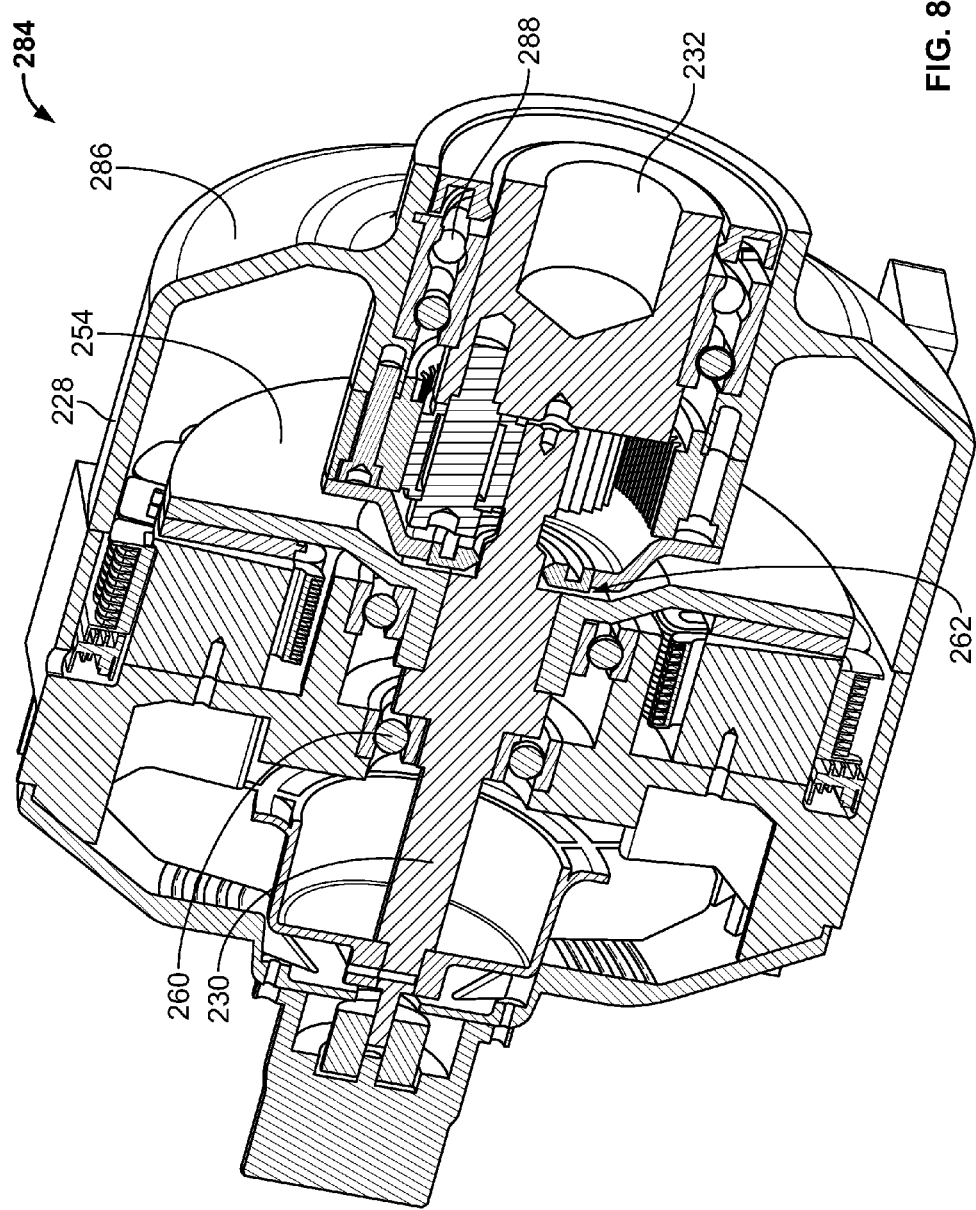
FIG. 8 is perspective cutaway view of the electrical machine shown in FIG. 7.

FIG. 8 is a cross sectional view of another exemplary motor 284. In FIG. 8, the same components of FIG. 7 are noted with the same reference numerals as in FIG. 7. Motor 284 includes an end cap 286 that is integrally coupled to housing 228. Gearbox 262 is coupled to first shaft 230 and second shaft 232. In the exemplary embodiment, gearbox 262 is positioned between rotor 254 and end cap 286. Accordingly, gearbox 262 is positioned within housing 228 as are stator 238 and rotor 254 to reduce the size of motor 284.

Figure 9:
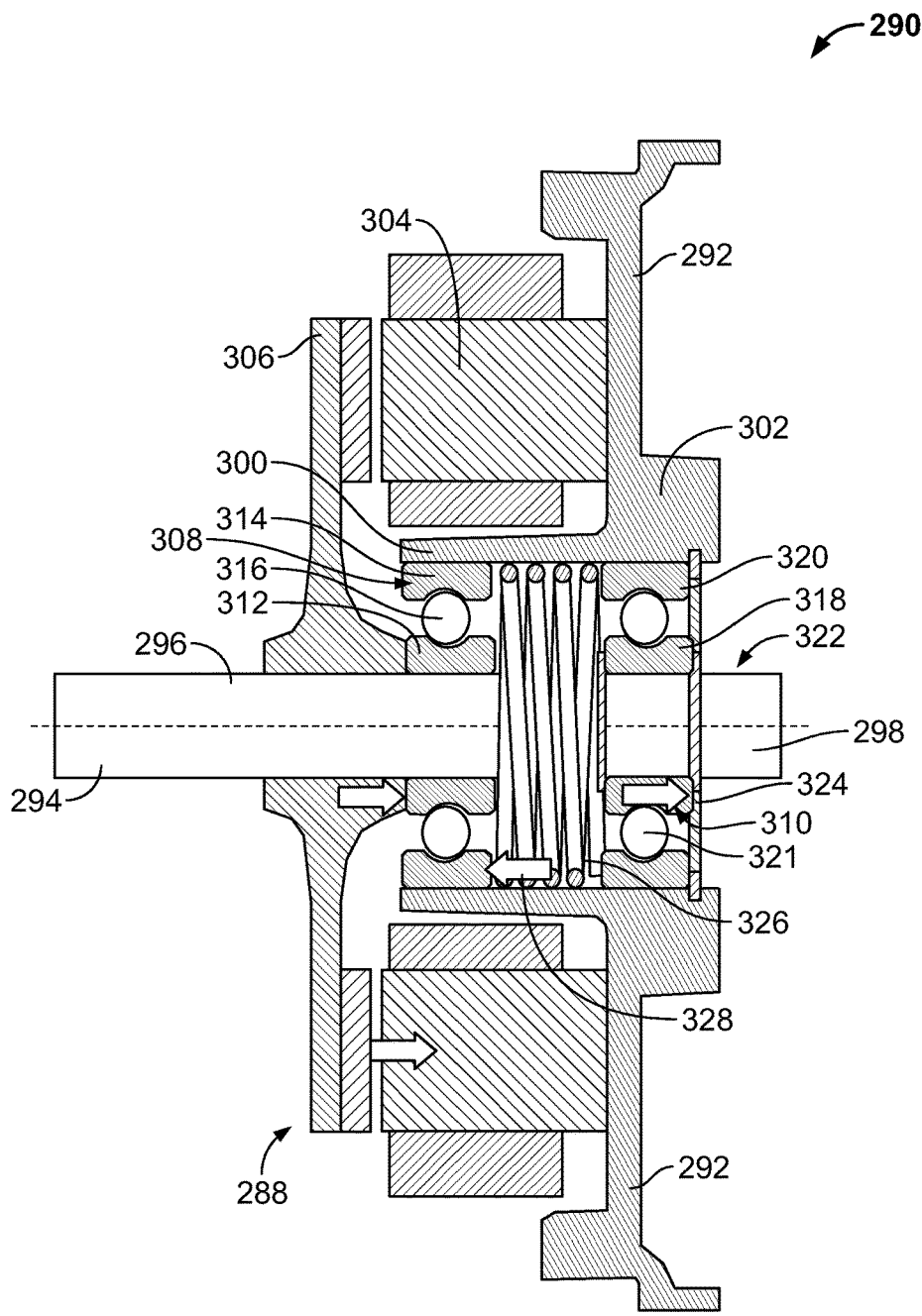
FIG. 9 is a side cross sectional view of a bearing assembly and shaft of another electrical machine.

FIG. 9 is a side cross sectional view of an exemplary bearing assembly 288 coupled to a motor 290. In the exemplary embodiment, bearing assembly 288 is also configured to couple to at least motor 100, motor 188, motor 196, motor 210, motor 226 and motor 284. Motor 290 includes a housing 292 and a shaft 294 having a first shaft portion 296 and a second shaft portion 298. Housing 292 includes a first support portion 300 and a second support portion 302. Motor 290 further includes a stator 304 coupled to housing 292 and a rotor 306 coupled to first shaft portion 296. In the exemplary embodiment, rotor 306 is electro-magnetically coupled to stator 304. During operation of motor 290, rotor 306 is configured to apply a magnet attraction force 307 toward stator 304.

Bearing assembly 288 includes a first bearing 308 coupled to first shaft portion 296 and to first housing support 300. Moreover, bearing assembly 288 includes a second bearing 310 coupled to second shaft portion 298 and to second housing support 302. First bearing 308 includes an inner race 312, such as a cone, coupled to first shaft portion 296 and an outer race 314, such as a cup, coupled to first housing support 300. A roller bearing 316 is coupled to and positioned between inner race 312 and outer race 314. In the exemplary embodiment, first bearing 308 is slide fitted within housing 292. Alternatively, first bearing 308 can be coupled to housing 272 in any method and/or configuration.

Second bearing 310 includes an inner race 318 coupled to second shaft portion 298 and an outer race 320 coupled to second housing support 302. A second roller bearing 321 is coupled to and positioned between inner race 318 and outer race 320. A fastener 322, such as a circlip, couples inner race 318 to second shaft portion 298. Moreover, a fastener 324, such as a retaining ring, couples outer race 320 to second housing support 302. Fasteners 322, 324 can include any configuration to enable second bearing 310 to function.

Bearing assembly 288 further includes a bias 326, such as a spring coil, coupled to and positioned between first bearing 308 and second bearing 310. In the exemplary embodiment, spring coil 326 is configured to apply a spring bias force 328 against first bearing 308 to counter rotor magnetic attraction force 307 applied by rotor 306 to first bearing 308. Moreover, coil spring 326 is configured to apply spring bias force 328 against second bearing 310. Retaining ring 324 is configured to counter spring bias force 328. Coil spring 326 is configured to oppose rotor magnetic attraction force 307 to facilitate reducing net forces applied to first bearing 308 and second bearing 310 to increase the operating life of first bearing 308 and second bearing 310.

Figure 10:
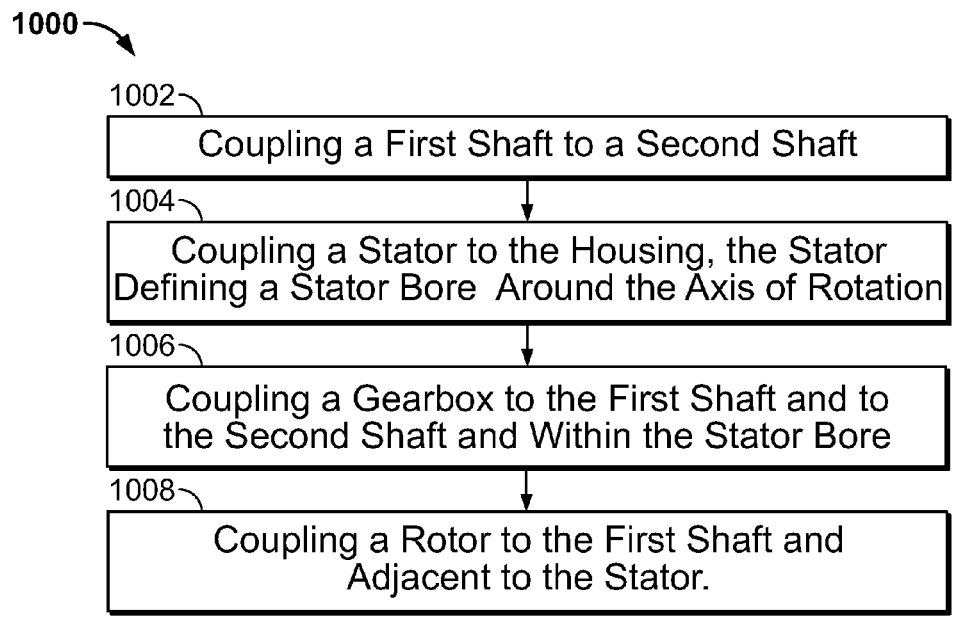
FIG. 10 is an exemplary flowchart illustrating a method of assembling an electrical machine.

FIG. 10 is an exemplary flowchart illustrating a method 1000 of assembling an electrical machine, for example motor 100 (shown in FIG. 1). Method 1000 includes coupling 1002 a first shaft, for example first shaft 142 (shown in FIG. 1), to a second shaft, such as second shaft 144 (shown in FIG. 1). A stator, for example stator 124 (shown in FIG. 1), is coupled 1004 to a housing, such as housing 102 (shown in FIG. 1). The stator defines a stator bore, for example stator bore 134 (shown in FIG. 1), around an axis of rotation, for example axis of rotation 112 (shown in FIG. 1). In the exemplary embodiment, method 1000 includes coupling 1006 a gearbox, such as gearbox 170 (shown in FIG. 1), to the first shaft and to the second shaft and within the stator bore. Further, method 1000 includes coupling 1008 a rotor, for example rotor 140 (shown in FIG. 1), to the first shaft and adjacent to the stator. Moreover, method 1000 includes coupling a fan, for example fan 166 (shown in FIG. 1), to the first shaft and coupling a heat transfer device, such as heat transfer member 136 (shown in FIG. 1), to the stator.

Figure 11:
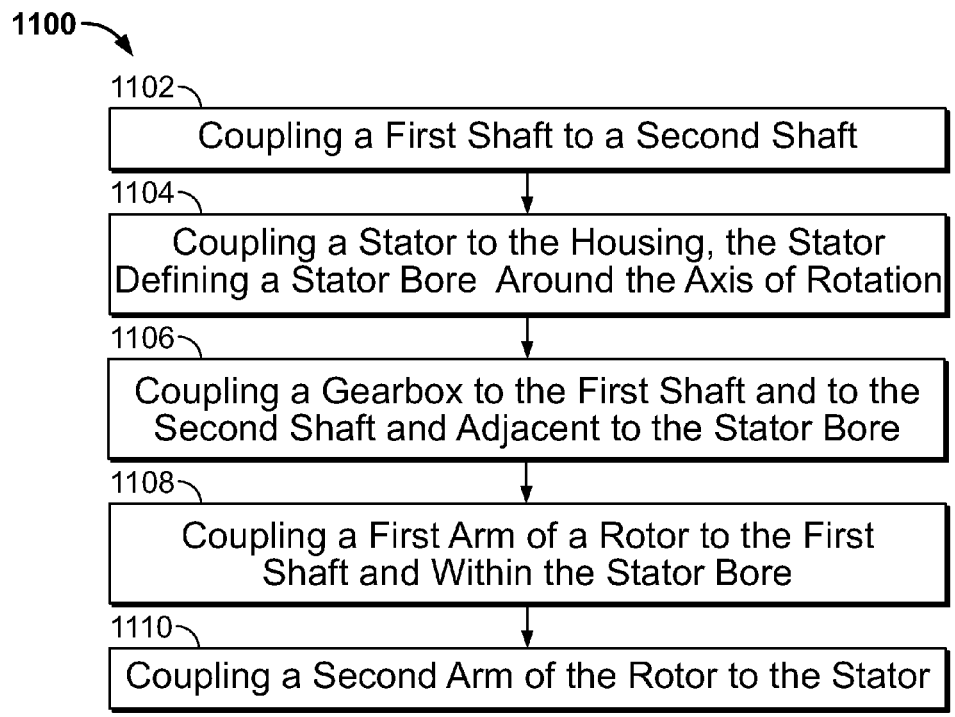
FIG. 11 is an exemplary flowchart illustrating another method of assembling an electrical machine.

FIG. 11 is an exemplary flowchart illustrating another method 1100 of assembling an electrical machine, such as motor 226 (shown in FIG. 7). Method 1100 includes coupling 1102 a first shaft, for example first shaft 230 (shown in FIG. 7), to a second shaft, such as second shaft 232 (shown in FIG. 7) A stator, for example stator 238 (shown in FIG. 7) is coupled 1104 to a housing, such as housing 228 (shown in FIG. 7). The stator defines a stator bore, for example stator bore 244 (shown in FIG. 7), around an axis of rotation, for example axis of rotation 246 (shown in FIG.

7). In the exemplary embodiment, method 1100 includes coupling 1106 a gearbox, for example gearbox 262 (shown in FIG. 7), to the first shaft and to the second shaft and adjacent the stator bore. Further, method 1100 includes coupling 1108 a first arm, for example first arm 256 (shown in FIG. 7), of the rotor to the first shaft and within the stator bore and coupling 1110 a second arm, for example second arm 258 (shown in FIG. 7), of the rotor to the stator. Moreover, method 1100 includes coupling a pin, such as pin 274 (shown in FIG. 7), to the gearbox and to the second shaft. Method 1100 further includes coupling a heat fin, for example heat fin 252 (shown in FIG. 7), to the stator and within the housing.

A technical effect of the systems and methods described herein includes at least one of: a housing, a first shaft coupled to the housing and a second shaft coupled to the first shaft. The motor further includes a stator coupled to the housing and comprising an outer circumferential surface and an inner circumferential surface, wherein the inner circumferential surface defines a stator bore around the axis of rotation. A gearbox is coupled to the first shaft and to the second shaft and is positioned within the stator bore. The motor includes a rotor coupled to the first shaft and adjacent the stator.

The exemplary embodiments described herein facilitate enclosing a motor and a gearbox within a single motor housing. More particularly, the exemplary embodiments are configured to maximize space usage and minimize losses. Moreover, the exemplary embodiments enable motors to be utilized in challenging environments such as confined spaces and/or minimal or no forced air cooling for the electrical machine. Still further, the exemplary embodiments increase efficiency and reduce operating and maintenance costs associated with the electrical machine.

In the exemplary embodiment, the motor can include a variety of configurations and sizes such as, but not limited to, a permanent magnet motor, a synchronous machine and an axial flux motor. Examples of motors that may include interior permanent magnet rotors include, but are not limited to, electronically commutated motors (ECMs). ECMs may include, but are not limited to, brushless direct current (BLDC) motors, brushless alternating current (BLAC) motors, and synchronous reluctance motors. Moreover, the motor is configured to provide about 30 lb-ft input force and about 167 lb-ft output force.

Exemplary embodiments of an electrical machine and methods for assembling the electrical machine are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications. Moreover, the electrical machine can include a forced air device, such as a fan, coupled to housing and/or shaft.

While the embodiments described herein are described with respect to motors in which a stator surrounds a rotor such as, for example, a permanent magnet rotor or an induction rotor, embodiments are contemplated in which an "inside-out" motor incorporates one or more of the improvements described herein. Inside-out motors refer to motors where a stationary stator is surrounded by a rotating rotor. Further, the embodiments are applicable to any permanent magnet rotating machine.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor having an axis of rotation, said motor comprising:
    a housing having a first end cap and an opposite second end cap, wherein said first end cap and said second end cap define an internal cavity;
    a first shaft coupled to said housing;
    a second shaft rotationally coupled to said first shaft;
    a stator coupled to said second end cap and positioned within said internal cavity, said stator comprising an outer circumferential surface and an inner circumferential surface, said inner circumferential surface defining a stator bore around the axis of rotation;
    a gearbox coupled to said first shaft and to said second shaft and positioned within said stator bore within said internal cavity, said gearbox comprising a planetary gear system comprising a sun gear, a ring gear, and a plurality of planet gears, said ring gear coupled directly to said second end cap, said gearbox further comprising a fastener extending through at least one planet gear of said plurality of planet gears and said second shaft such that said plurality of planet gears are rotationally coupled to said second shaft; and
    a rotor coupled directly to said first shaft and positioned within said internal cavity between said first end cap and said ring gear, said rotor configured to rotate said first shaft, wherein said rotor is offset from said stator in an axial direction.

2. The motor of claim 1, further comprising a heat transfer member coupled to said outer circumferential surface.

3. The motor of claim 1, further comprising a lubrication assembly coupled in flow communication to said first shaft, said second shaft and said gearbox.

4. The motor of claim 1, further comprising a fan coupled to said first shaft.

5. The motor of claim 1, further compromising at least one of an encoder and a brake coupled to said first shaft.

6. The motor of claim 1, further comprising a bearing assembly coupled to at least first shaft and comprising a first bearing, a second bearing and a bias coupled to said first bearing and said second bearing.

7. The motor of claim 1, wherein said first shaft includes a first end and a second end, said first end of said first shaft coupled to said housing, said sun gear coupled to said second end of said first shaft.

8. A method of assembling a motor having a housing defining an internal cavity and an axis of rotation, said method comprising:
- coupling a first shaft to a second shaft;
- coupling a stator to the housing, the stator defining a stator bore that extends around the axis of rotation, wherein the stator is positioned within the internal cavity;
- coupling a gearbox to the first shaft and to the second shaft, wherein the gearbox is positioned within the stator bore within the internal cavity, the gearbox including a sun gear, a ring gear, and a plurality of planet gears, the ring gear having a bearing assembly, the gearbox further including a fastener extending through at least one planet gear of the plurality of planet gears and the second shaft such that the plurality of planet gears are rotationally coupled to the second shaft;
- coupling the ring gear directly to the housing such that an outer circumferential surface of the ring gear is positioned directly adjacent an inner circumferential surface of the stator; and
- coupling a rotor directly to the first shaft adjacent the stator and to the ring gear bearing assembly such that the rotor is configured to rotate the first shaft.

9. The method of claim 8, further comprising coupling a fan to the first shaft.

10. The method of claim 8, further comprising coupling a heat transfer member to the stator.

* * * * *